(12) United States Patent
Gerguri

(10) Patent No.: US 12,239,261 B2
(45) Date of Patent: Mar. 4, 2025

(54) COMBINATION WHISK AND SPATULA ASSEMBLY

(71) Applicant: Karmelina Gerguri, Bronx, NY (US)

(72) Inventor: Karmelina Gerguri, Bronx, NY (US)

(*) Notice: Subject to any disclaimer, the term of this patent is extended or adjusted under 35 U.S.C. 154(b) by 325 days.

(21) Appl. No.: 17/577,255

(22) Filed: Jan. 17, 2022

(65) Prior Publication Data

US 2023/0225565 A1 Jul. 20, 2023

(51) Int. Cl.
*A47J 43/28* (2006.01)
*A47J 43/10* (2006.01)

(52) U.S. Cl.
CPC ......... *A47J 43/288* (2013.01); *A47J 43/1093* (2013.01)

(58) Field of Classification Search
CPC ............................ A47J 43/288; A47J 43/1093
USPC .............................................................. 7/110
See application file for complete search history.

(56) References Cited

U.S. PATENT DOCUMENTS

| | | | | |
|---|---|---|---|---|
| 2,853,780 | A * | 9/1958 | Bull | A47J 43/281 30/296.1 |
| 4,735,510 | A * | 4/1988 | Barbour | A47J 43/1093 366/129 |
| 5,813,755 | A * | 9/1998 | Proshan | A47J 43/10 416/70 R |
| 5,813,756 | A * | 9/1998 | Proshan | A47J 43/1087 416/70 R |
| D493,678 | S | 8/2004 | Greco | |
| D551,523 | S | 9/2007 | Schanche | |
| 8,033,713 | B2 | 10/2011 | Lion | |
| D793,822 | S * | 8/2017 | Joseph | D7/688 |
| 10,595,680 | B2 | 3/2020 | Audet | |
| 2008/0034981 | A1* | 2/2008 | Mayer | A47J 43/288 99/424 |
| 2008/0068921 | A1* | 3/2008 | Schanche | A47J 43/1093 366/129 |
| 2011/0174908 | A1 | 7/2011 | Curtin | |

FOREIGN PATENT DOCUMENTS

WO WO2010130826 11/2010

* cited by examiner

*Primary Examiner* — Hadi Shakeri

(57) ABSTRACT

A combination whisk and spatula assembly includes a handle that has a flattened base and the handle is standable in an upright position having the flattened base resting on a horizontal support surface. A whisk is coupled to and extends away from the handle such that the whisk can be manipulated for mixing a fluid food material. A cup extends around the whisk and the cup captures fluid dripping from the whisk when the handle is stood upon the flattened base. A pair of blades is each coupled to the whisk and each of the blades has a curved profile. In this way each of the blades can be scraped against an inside surface of a mixing bowl for removing fluid food material from the inside surface of the mixing bowl.

4 Claims, 4 Drawing Sheets

COMBINATION WHISK AND SPATULA ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to whisk devices and more particularly pertains to a new whisk device for mixing batter and scraping the batter from an inside surface of a mixing bowl. The device includes a handle and a whisk coupled to the handle for mixing batter. The device includes a cup which surrounds a base of whisk for capturing dripping batter and the device includes a pair of curved blades each coupled to the whisk. The curved blades can be scraped against the inside surface of the mixing bowl to scrape the batter from the mixing bowl.

(2) Description of Related Art Including Information Disclosed Under 37 CFR 1.97 and 1.98

The prior art relates to whisk devices including a whisk which has a holder integrated into the whisk for hanging the whisk on an edge of a mixing bowl. The prior art discloses a spatula with a plurality of grooves for wiping wires of a whisk. The prior art discloses a whisk with a blade extending over a respective member of the whisk for scraping a mixing bowl. The prior art discloses a whisk which includes a frame that extends around the whisk for scraping a mixing bowl. The prior art discloses a squeegee whisk which includes a plurality of wiping members that are arranged into a bulbous basket. The prior art discloses a variety of ornamental designs of a whisk which include a wiping element for wiping a mixing bowl.

BRIEF SUMMARY OF THE INVENTION

An embodiment of the disclosure meets the needs presented above by generally comprising a handle that has a flattened base and the handle is standable in an upright position having the flattened base resting on a horizontal support surface. A whisk is coupled to and extends away from the handle such that the whisk can be manipulated for mixing a fluid food material. A cup extends around the whisk and the cup captures fluid dripping from the whisk when the handle is stood upon the flattened base. A pair of blades is each coupled to the whisk and each of the blades has a curved profile. In this way each of the blades can be scraped against an inside surface of a mixing bowl for removing fluid food material from the inside surface of the mixing bowl.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
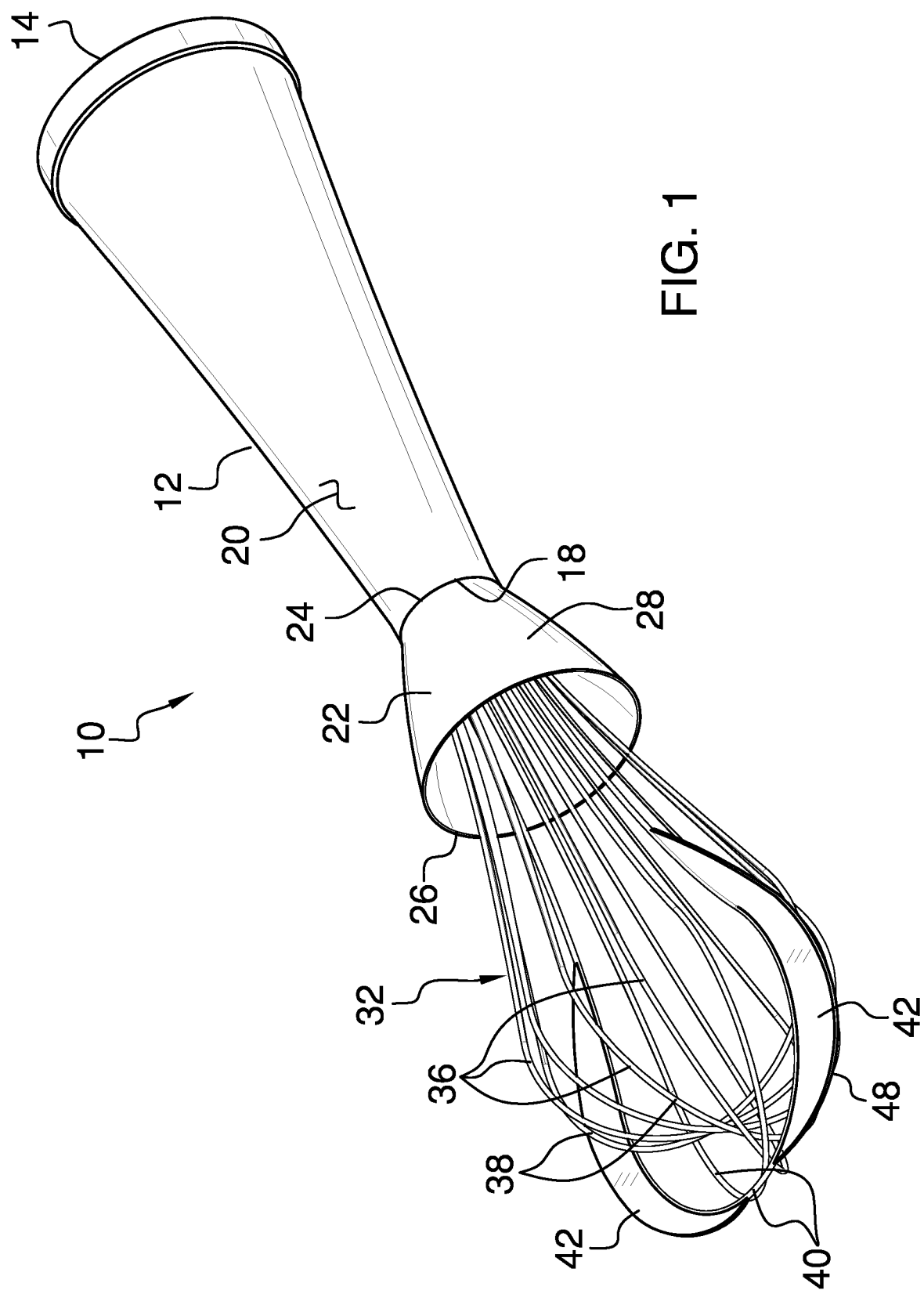
FIG. 1 is a top perspective view of a combination whisk and spatula assembly according to an embodiment of the disclosure.
Figure 2:
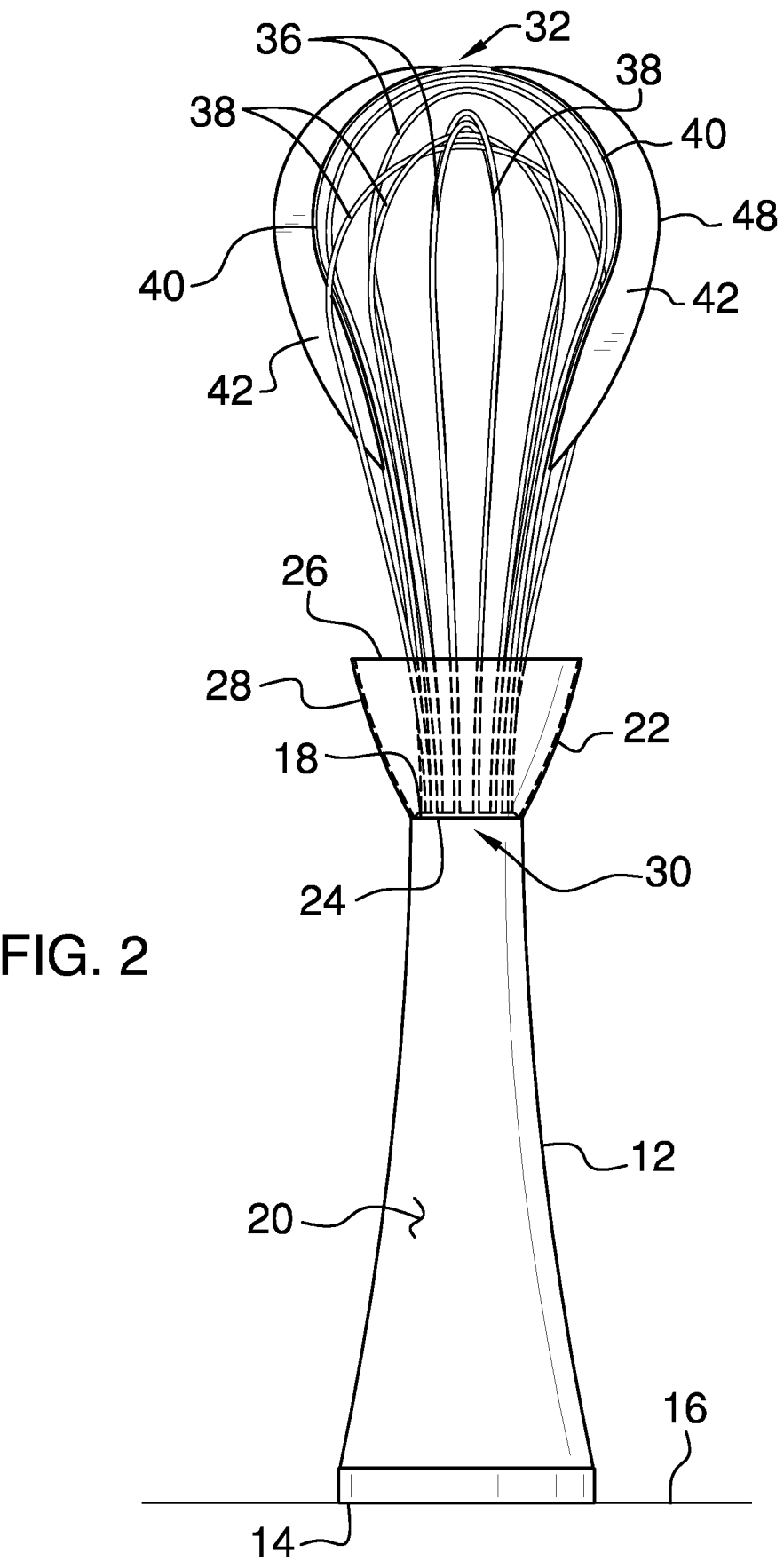
FIG. 2 is a front phantom view of an embodiment of the disclosure.
Figure 3:
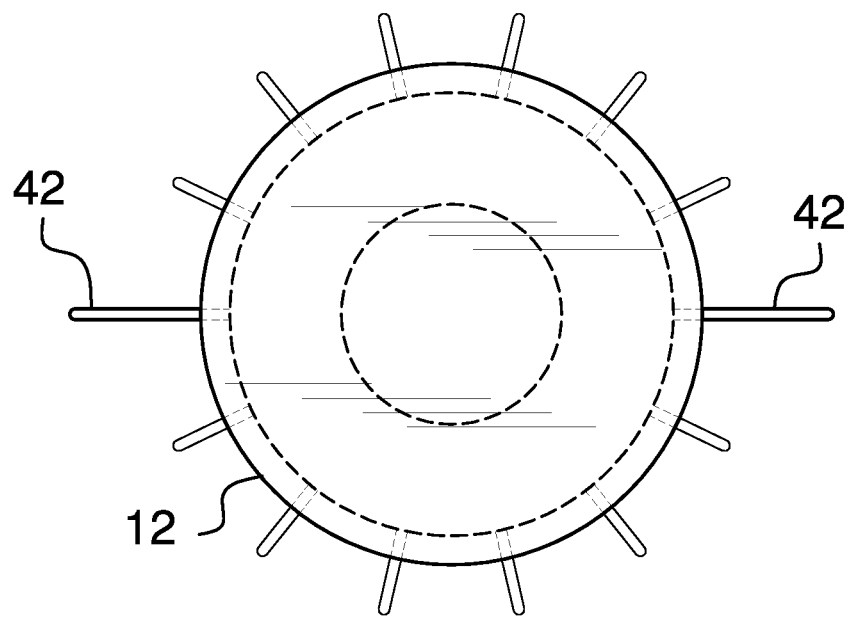
FIG. 3 is a bottom phantom view of an embodiment of the disclosure.
Figure 4:
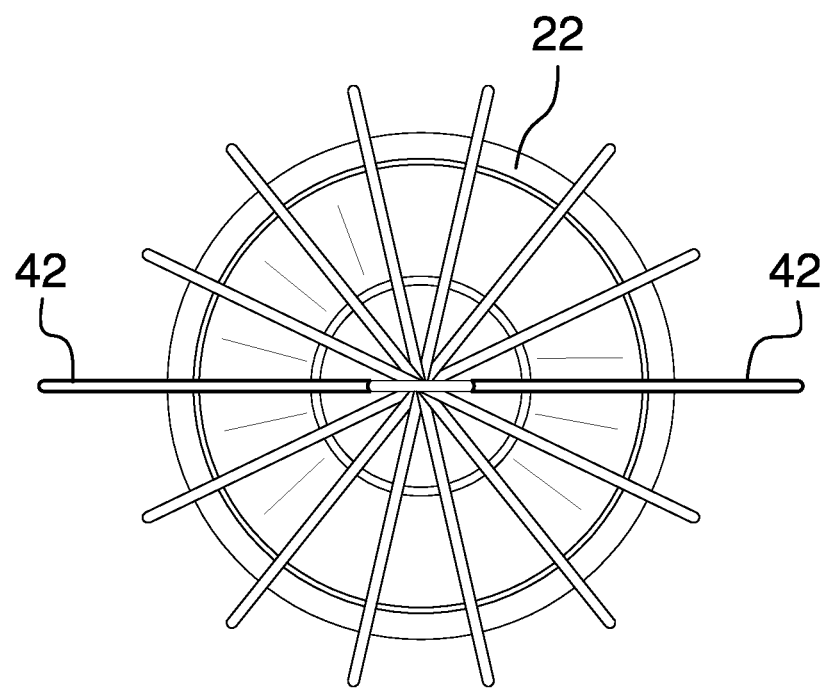
FIG. 4 is a top view of an embodiment of the disclosure.
Figure 5:
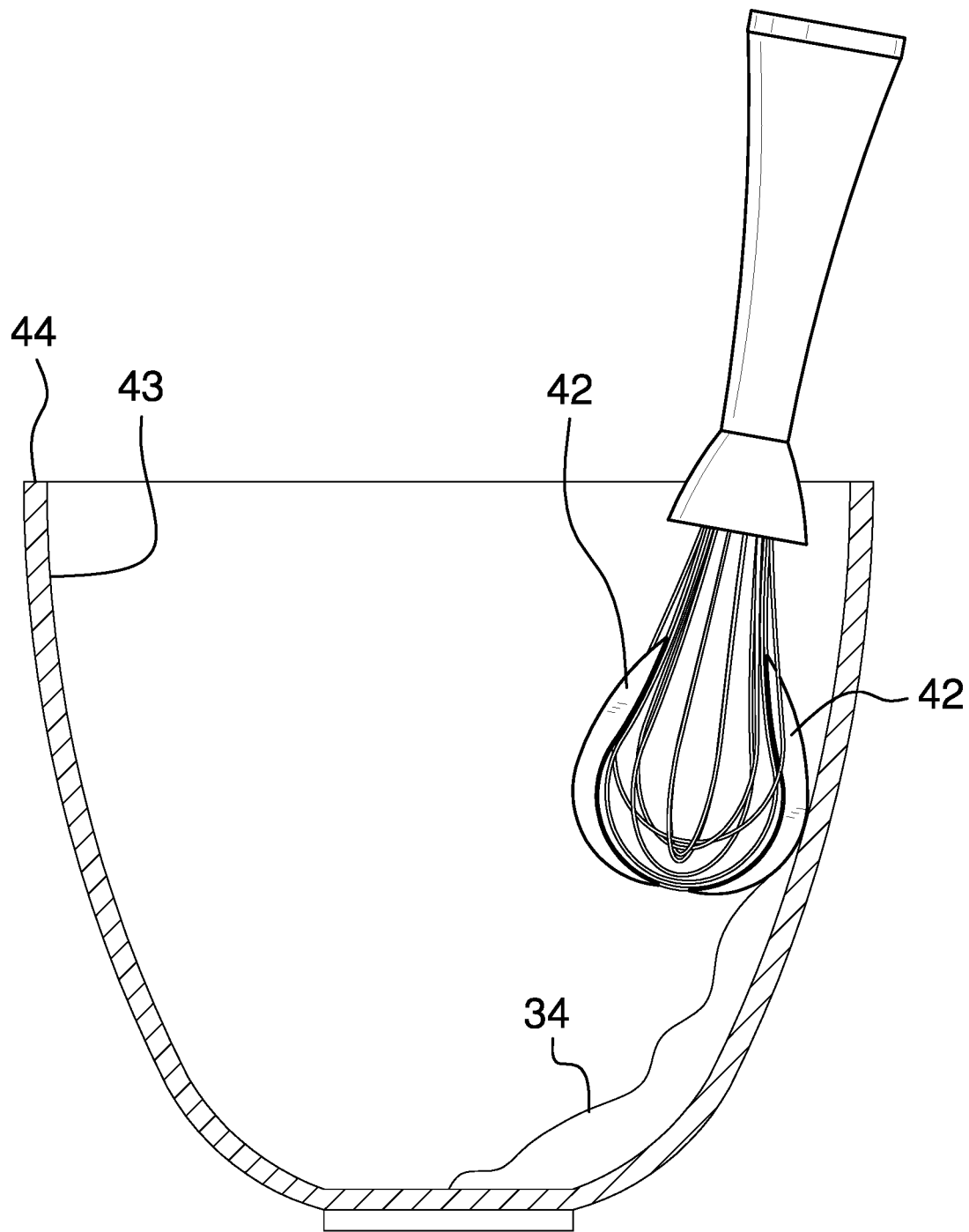
FIG. 5 is a perspective in-use view of an embodiment of the disclosure.

With reference now to the drawings, and in particular to FIGS. 1 through 5 thereof, a new whisk device embodying the principles and concepts of an embodiment of the disclosure and generally designated by the reference numeral 10 will be described.

As best illustrated in FIGS. 1 through 5, the combination whisk and spatula assembly 10 generally comprises a handle 12 that has a flattened base 14. The handle 12 is standable in an upright position having the flattened base 14 resting on a horizontal support surface 16. The handle 12 has a distal end 18 with respect to the flattened base 14 and an outer surface 20 extending between the flattened base 14 and the distal end 18. Furthermore, the outer surface 20 is continuously arcuate about an axis extending between the distal end 18 and the flattened base 14 such that the handle 12 has a cylindrical shape, and the handle 12 is elongated between the distal end 18 and the flattened base 14. The outer surface 20 tapers inwardly between the flattened base 14 and the distal end 18 such that the handle 12 has a frustoconical shape.

A cup 22 is provided and the cup 22 is coupled to the handle 12. The cup 22 has a lower end 24, an upper end 26 and an outer wall 28 extending between the lower end 24 and the upper end 26. Each of the lower end 24 and the upper end 26 is open, and the lower end 24 is coupled to the distal end 18 of the handle 12 such that the distal end 18 of the handle 12 defines a base 30 of the cup 22. Additionally, the outer wall 28 flares outwardly between the lower end 24 and the upper end 26.

A whisk 32 is coupled to and extends away from the handle 12 such that the whisk 32 can be manipulated for mixing a fluid food material 34, including but not being limited to, pancake batter, brownie mix or other type of batter. The cup 22 extends around the whisk 32 such that the cup 22 captures fluid dripping from the whisk 32 when the handle 12 is stood upon the flattened base 14. The whisk 32 comprises a plurality of members 36 that is each coupled to the distal end 18 of the handle 12 and forming an arc extending away from the distal end 18. The plurality of members 36 includes a set of first members 38 and a set of second members 40. The set of first members 38 is arranged to form a bulb. Additionally, each of the second members 40 has a length that is greater than a length of the first members 38, and the set of second members 40 is arranged to surround the set of first members 38.

A pair of blades 42 is provided and each of the blades 42 is coupled to the whisk 32. Each of the blades 42 has a curved profile thereby facilitating each of the blades 42 to be scraped against an inside surface 43 of a mixing bowl 44 for removing fluid food material 34 from the inside surface 43 of the mixing bowl 44. Each of the blades 42 extends laterally away from a respective one of the second members 36 of the whisk 32. The pair of blades 42 are positioned on opposing legs 46 of the respective second member 40 and each of the blades 42 has a distal edge 48 with respect to the respective second member 40. The distal edge 48 of each of the blades 42 curves outwardly from the respective second member 40 such that the distal edge 48 of each of the blades 42 can conform to curvature of the inside surface 43 of the mixing bowl 44.

In use, the handle 12 is gripped to employ the whisk 32 in the traditional convention of employing a whisk. Additionally, either of the blades 42 can be scraped against the inside surface 43 of the mixing bowl 44 to scrape brownie mix, for example, off of the inside surface 43 for fully whisking the brownie mix. The handle 12 can be stood upon the flattened base 14 for temporary storage and the cup 22 captures any liquid food material 34 that drips from the whisk 32. In this way the whisk 32, blades 42 and cup 22 perform the duties of a variety of different kitchen tools for mixing.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A combination whisk and spatula assembly for mixing a batter for cooking, said assembly comprising:
   a handle having a flattened base, said handle being standable in an upright position having said flattened base resting on a horizontal support surface;
   a cup being coupled to said handle;
   a whisk being coupled to and extending away from said handle wherein said whisk is configured to be manipulated for mixing a fluid food material, said cup extending around said whisk wherein said cup is configured to capture fluid dripping from said whisk when said handle is stood upon said flattened base;
   a pair of blades, each of said blades being coupled to said whisk, each of said blades having a curved profile wherein each of said blades is configured to be scraped against an inside surface of a mixing bowl for removing fluid food material from the inside surface of the mixing bowl, each of said blades having a tapered end positioned opposite said cup, said tapered ends being spaced from each other such that an end of said whisk extending between said blades is flush with said tapered ends of said blades;
   wherein said handle has a distal end with respect to said flattened base and an outer surface extending between said flattened base and said distal end, said outer surface being continuously arcuate about an axis extending between said distal end and said flattened base such that said handle has a cylindrical shape, said handle being elongated between said distal end and said flattened base, said outer surface tapering inwardly between said flattened base and said distal end such that said handle has a frustoconical shape;
   wherein said whisk comprises a plurality of members each being coupled to said distal end of said handle and forming an arc extending away from said distal end;
   wherein said plurality of members includes a set of first members and a set of second members;
   wherein said set of first members being arranged to form a bulb; and
   wherein each of said second members had a length being greater than a length of said first members, said set of second members surrounding said set of first members.

2. The assembly according to claim 1, wherein said cup has a lower end, an upper end and an outer wall extending between said lower end and said upper end, each of said lower end and said upper end being open, said lower end being coupled to said distal end of said handle such that said distal end of said handle defines a base of said cup, said outer wall flaring outwardly between said lower end and said upper end.

3. The assembly according to claim 1, wherein each of said blades extends laterally away from a respective one of said second members of said whisk, said pair of blades being positioned on opposing legs of said respective second member, each of said blades having a distal edge with respect to said respective second member, said distal edge of each of said blades curving outwardly from said respective second member wherein said distal edge of each of said blades is configured to conform to curvature of the inside surface of the mixing bowl.

4. A combination whisk and spatula assembly for mixing a batter for cooking, said assembly comprising:
- a handle having a flattened base, said handle being standable in an upright position having said flattened base resting on a horizontal support surface, said handle having a distal end with respect to said flattened base and an outer surface extending between said flattened base and said distal end, said outer surface being continuously arcuate about an axis extending between said distal end and said flattened base such that said handle has a cylindrical shape, said handle being elongated between said distal end and said flattened base, said outer surface tapering inwardly between said flattened base and said distal end such that said handle has a frustoconical shape;
- a cup being coupled to said handle, said cup having a lower end, an upper end and an outer wall extending between said lower end and said upper end, each of said lower end and said upper end being open, said lower end being coupled to said distal end of said handle such that said distal end of said handle defines a base of said cup, said outer wall flaring outwardly between said lower end and said upper end;
- a whisk being coupled to and extending away from said handle wherein said whisk is configured to be manipulated for mixing a fluid food material, said cup extending around said whisk wherein said cup is configured to capture fluid dripping from said whisk when said handle is stood upon said flattened base, said whisk comprising a plurality of members each being coupled to said distal end of said handle and forming an arc extending away from said distal end, said plurality of members including a set of first members and a set of second members, said set of first members being arranged to form a bulb, each of said second members having a length being greater than a length of said first members, said set of second members surrounding said set of first members; and
- a pair of blades, each of said blades being coupled to said whisk, each of said blades having a curved profile wherein each of said blades is configured to be scraped against an inside surface of a mixing bowl for removing fluid food material from the inside surface of the mixing bowl, each of said blades having a tapered end positioned opposite said cup, said tapered ends being spaced from each other such that an end of said whisk extending between said blades is flush with said tapered ends of said blades, each of said blades extending laterally away from a respective one of said second members of said whisk, said pair of blades being positioned on opposing legs of said respective second member, each of said blades having a distal edge with respect to said respective second member, said distal edge of each of said blades curving outwardly from said respective second member wherein said distal edge of each of said blades is configured to conform to curvature of the inside surface of the mixing bowl.

\* \* \* \* \*